INVENTOR
William A. Whitesell

BY
Mason, Fenwick & Lawrence
ATTORNEYS

INVENTOR
William A. Whitesell

BY Mason, Fenwick & Lawrence
ATTORNEYS

United States Patent Office 3,205,367

Patented Sept. 7, 1965

3,205,367

OPTICAL SCANNING APPARATUS FOR AUTOMATIC CHARACTER SENSING DEVICES AND THE LIKE

William A. Whitesell, Great Falls, Va., assignor to Farrington Electronics Inc., Alexandria, Va., a corporation of Massachusetts Filed July 6, 1962, Ser. No. 208,084
10 Claims. (Cl. 250—235)

The present invention relates to optical scanning systems for scanning a field such as a character-bearing document or the like, and more particularly to oscillating mirror optical scanning assemblies for use with automatic character recognition systems, especially of the type having a rotary scanning disk.

The present invention, while being subject to numerous applications which will be apparent to persons skilled in the art to which the invention pertains, is particularly applicable to automatic character sensing equipment of the type wherein the scanning assembly employs rotatable scanning disk having circumferentially spaced radial slits coacting with a pair or pairs of fixed parallel, tangentially oriented slits to effect detail scanning of character images along rectilinear scan lines as illustrated in U.S. Patent No. 2,978,590 issued to David H. Shepard on April 4, 1961. The ensuing description will be directed to the use of the present invention in connection with such a scanning assembly of automatic character sensing equipment. The description of the manner of application of the present invention to this particular field of use will be adequate to enable persons skilled in the art to understand the manner of its use in other applications.

Automatic character recognition systems have been heretofore devised for sensing information-bearing documents and producing electrical output signals identifying information sensed by the apparatus. Such equipment may briefly be described as apparatus for scanning intelligence-bearing documents containing items of information such as printed characters, usually in the form of alphabetical letters and Arabic numerals, which apparatus senses the presence and/or absence of bits of each character thereon with reference to a time and/or positional base and relation, and produces signals indicative of the presence and absence of such bits of characters within the scanning field, an output being produced at some time indicative of the character read. Examples of typical character sensing apparatus are disclosed in U.S. Patent No. 2,663,758 granted December 22, 1953 to David H. Shepard and U.S. Patent 2,897,481 granted July 28, 1959 to David H. Shepard.

In order to provide for high-speed scanning of character-bearing documents such as pages of paper, it is desirable to scan transversely of the document along each successive line of characters on the page or along a selected line of characters on the page. In optical scanning, the document image must move past the scanning device, which motion however, may be either real or apparent. Advantages are realized if the document is held stationary and merely appears to move. One of the arrangements for effecting such scanning of the document has been to provide an oscillating sweep mirror which is moved about a pivot axis located above and perpendicular to the lines of characters. Such an arrangement provides for a lateral scan along a line of characters on the document which successively presents images of the characters comprising the line of characters to a rotating scanning disk of a scanning assembly such as referred to above to effect detail scanning of the character image. To avoid confusion in the ensuing description, the lateral scanning of the character-bearing document by the oscillating mirror will be referred to as line scanning to distinguish the same from the detail scanning of character images accomplished by the rotating disk.

With such an oscillating mirror device, it is essential that the document remain in reasonable focus to maintain satisfactory resolution and a constant magnification ratio. It will be apparent that if the mirror oscillates about a stationary mirror axis, the plane of sharp focus at the document sweeps in an arc about the mirror axis as the mirror sweeps across the document. A constant length optical path may be maintained throughout the line scanning of the characters by imparting an arcuate configuration to the document at the reading station corresponding to the arc through which sharp focus sweeps. Disposing the document at the reading station in such an arcuate configuration, however, presents problems in maintaining uniform illumination over the line of characters being scanned of sufficiently high intensity for proper, reliable response by the detecting components of the automatic character sensing apparatus designed to sense light variations during detail scanning of the character image.

An object of the present invention is the provision of novel apparatus for scanning lines of characters on character-bearing documents and the like at high speed, wherein a high intensity, evenly illuminated, light spot provides uniform illumination of the characters being scanned.

Another object of the present invention is the provision, in conjunction with an oscillating mirror scanning assembly which effects scanning of a line of characters on a character-bearing document during oscillation of the mirror, of novel illumination means involving a second oscillating mirror which is swept synchronously with sweeping of the first-mentioned oscillating mirror to effect sweeping of a light spot across the line of characters being read and provide high intensity uniform illumination of such characters.

Another object of the present invention is the provision of a novel optical scanning system for scanning character-bearing documents and the like to provide scanning signals for application to automatic character sensing apparatus, wherein the image of each scanned character is transmitted through a plurality of separate optical channels which may be independently adjusted to provide detail scanning of a plurality of image representations of each character in accordance with a variety of different scanning schemes.

Another object of the present invention is the provision of a novel optical scanning system for scanning character-bearing documents and the like to provide scanning signals for application to automatic character sensing apparatus, wherein two images of each scanned character are produced and directed to diametrically opposite portions of a rotating disk scanner to facilitate identification of the characters.

Another object of the present invention is the provision of a novel optical scanning assembly for scanning lines of characters on character-bearing documents to produce signals for application to automatic character sensing apparatus and the like, wherein means are provided to produce a plurality of images of each character during one sweep of the character by a sweep mirror to provide wide flexibility of programming of the apparatus to analyze and identify the characters.

Other objects, advantages and capabilities of the present invention will become apparent from the following detail description, taken in conjunction with the accompanying drawings illustrating a preferred embodiment of the invention, in which.

Figures 2, 4:
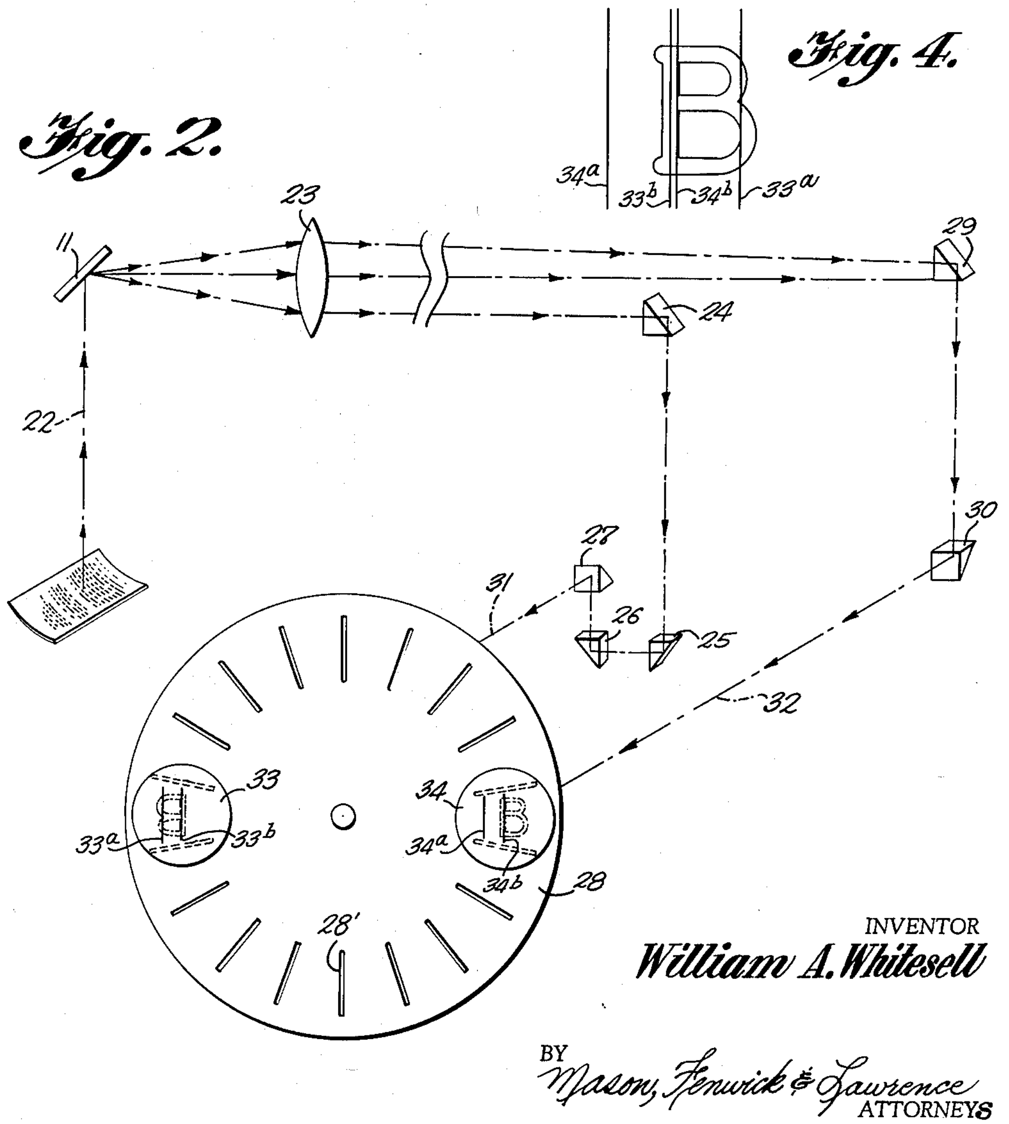
FIGURE 2 is a diagrammatic perspective view illustrating the arrangement of the optical scanning components for transmitting the character images from the document to the scanning disk in accordance with the present invention.
Figure 3:
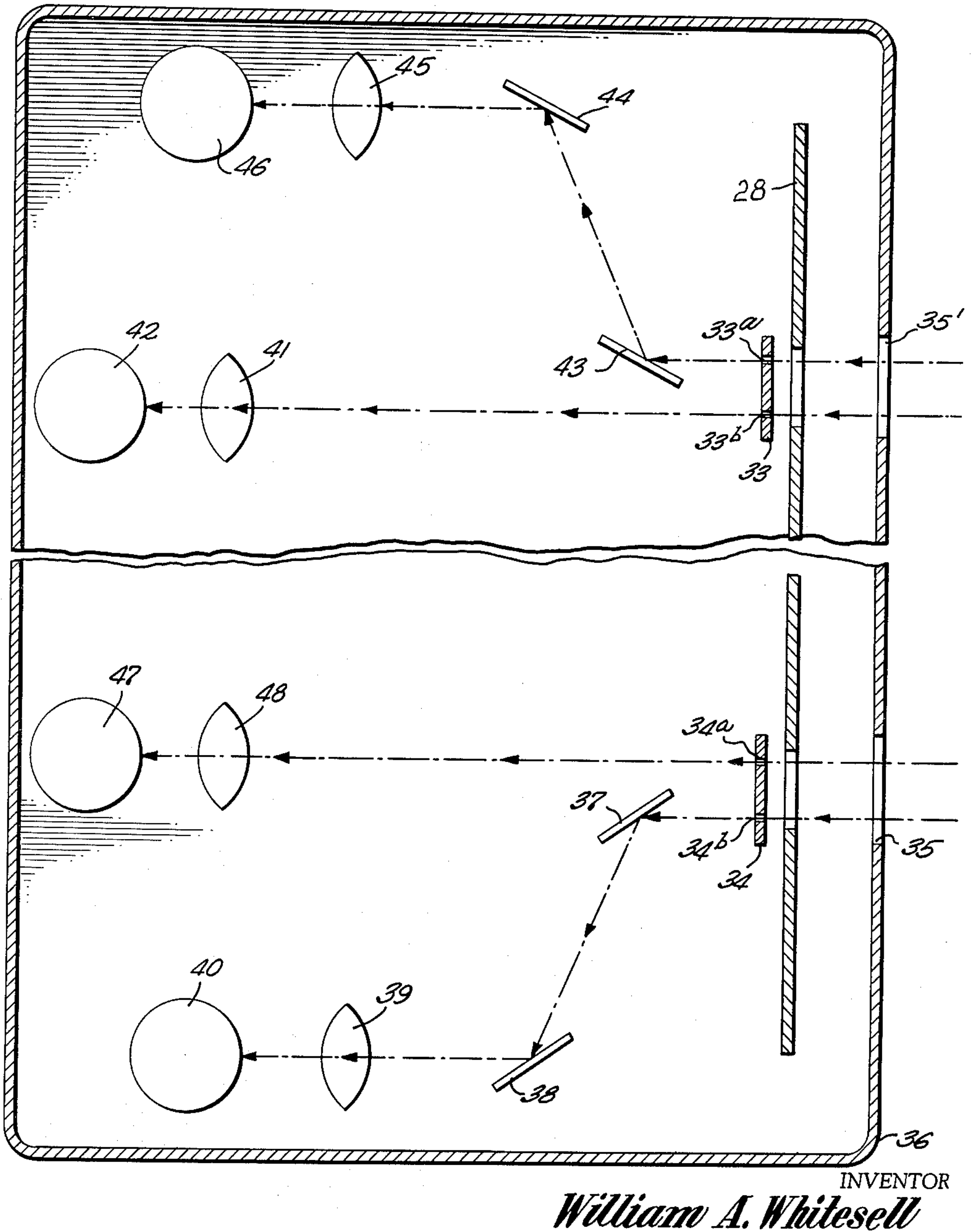

FIGURE 3 is a diagrammatic view of the photo tube detectors, the fixed slit plates and the scanning disk forming part of the optical scanning system of the present invention; and FIGURE 4 is a diagrammatic illustration of representations of the relative positions of the fixed slits projected back through the optical system of the scanning apparatus onto a character on a document at the reading station showing an example of how the fixed slits may be located relative to the character.

Figure 1:
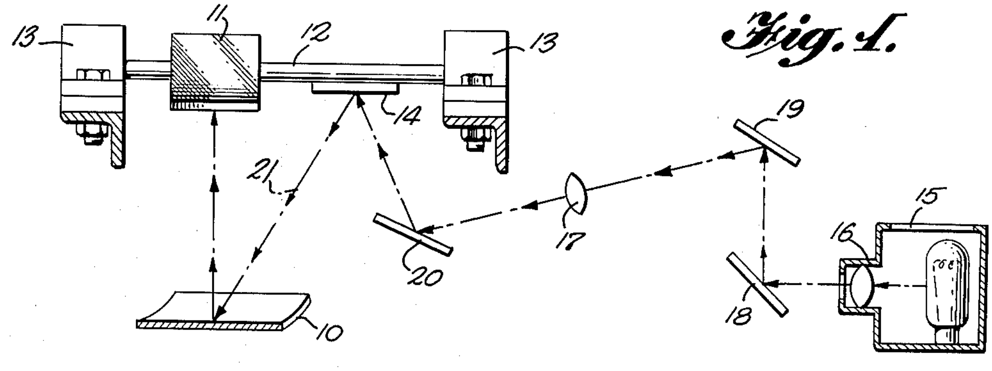
FIGURE 1 is a diagrammatic view illustrating a system for illuminating characters being scanned in accordance with the present invention.

Referring to the drawings, wherein like reference characters designate corresponding parts throughout the several figures and particularly to FIGURE 1, there is illustrated in diagrammatic form an arrangement for providing high intensity uniform illumination of the characters on the character-bearing document, indicated generally by the reference character 10, during scanning of a line of characters by an oscillating reading mirror producing a line scan of the characters wherein a whole line of characters is scanned in a single elongated rectilinear stroke to image the successive characters in the line on a rotatable scanning disk. The oscillating reading mirror is indicated in FIGURE 1 by the reference character 11 and is mounted on a suitable oscillating cam shaft 12 supported in fixed bearings 13 at a position overlying the document 10 when the document occupies the reading station of the character sensing apparatus. The optical scanning system in general includes a rotatable scanning disk having circumferentially spaced radial slits near the periphery thereof which are scanned across each of two fixed slit plates, each slit plate comprising a pair of tangentially oriented fixed slits adjacent the scanning disk, lens means and prism means for imaging the character images at a focal plane adjacent the scanning disk, and photomultiplier tubes or the like responsive to the light energy transmitted through the intersecting parts of the fixed slits and the radial slits on the scanning disk to produce signals indicative of the presence or absence of character portions at such intersecting points.

When such an oscillating mirror type of reading scan is used, proper illumination of the characters being scanned presents difficult problems. If a light source is provided to illuminate the entire document or an entire line of characters at the reading station, exceedingly high light energy levels must be maintained on the document to keep the light energy at the photocells up high enough to be above the shot noise level and correcting lenses would have to be used which exceed the state of the lens art or are prohibitively expensive. Further, it would be exceedingly difficult to obtain even, uniform illumination of the characters over the entire extent of the line of characters or the whole character-bearing document.

To provide maximum uniform illumination of the characters in a manner which overcomes the above-mentioned difficulties, an oscillating illuminating mirror 14 is likewise provided on the oscillating shaft 12 to effect sweeping of a high intensity, evenly illuminated light spot over the characters in synchronism with the sweeping movement of the oscillating reading mirror 11. The source of illumination is provided by a suitable projector lamp 15 whose beam is projected through condensing lens 16 and projecting lens 17 and is redirected by suitable reflecting mirrors 18, 19 and 20, where desired, to direct light onto the illuminating mirror 14 which reflects the light onto the document 10 to provide a high intensity spot at the exact portion of the document being imaged by the mirror 11 and the lens system associated with the mirror 11 toward the detecting phototubes. To achieve uniform maximum illumination, the projection lens 17 is positioned to form an image of the condensing lens 16 on the document and the projection lamp 15 is positioned so that an image of the filament of the lamp 15 is formed on the lens 17. The oscillating mirrors 11 and 14 always move in synchronism with each other by reason of the fact that they are both mounted on a single oscillating cam shaft, and the cam shaft 12 is activated in any suitable manner to effect successive sweeping of the spot of light produced by the reflected beam 21 from the illuminating mirror 14 and the document zone being imaged by the mirror 11 toward the detectors from one end of a line of characters to the other in line-by-line fashion as the document 10 is advanced through the reading station. Suitable means for effecting advancement of the document 10 through the reading station may, if desired, take the form illustrated and described in the patent application of Howard W. Silsby III and James W. Taylor Serial No. 208,432 entitled Document Feeding Mechanism filed concurrently with this application.

Referring to FIGURES 2 and 3, wherein the means for transmitting an image of the document area being scanned by the oscillating reading mirror 11 to the means for detecting the light energy level thereof and splitting the image into two document images are illustrated, the light reflected along the beam path 22 from the document 10 strikes the reading mirror 11 and is reflected through an enlarging lens 23 onto a beam splitting prism 24. The beam splitting prism 24 is located so that one-half of the bundle of light rays comprising the image forming beam emerging from the enlarging lens 23 passes above the prism 24 while the other half is deflected 90° or perpendicular to the document reference plane tangential to the document at the neutral optical axis of the mirror 11. The portion of the image beam which is deflected by the beam splitting prism 24 is reflected through another 90° by a prism 25 so that the beam is parallel to the document reference plane and moving back toward the document. This beam emerging from the prism 25 is then reflected through another 90° by the prism 26 so that the reflected beam is perpendicular to the document reference plane and moving away from the document. The beam emerging from the prism 26 is then reflected through still another 90° angle by the prism 27 in a direction parallel to the document reference plane and directed toward a rotatable scanner disk 28.

The portion of the image beam emerging from the lens 23 which passes over the beam splitting prism 24 enters a prism 29 which deflects the beam 90° so that it is perpendicular to the document reference plane, which beam is redirected by another prism 30 so that the beam emerging from the prism 30 is on the same plane and parallel to the image beam leaving the prism 27 and is directed onto the scanner disk 28. In this manner, two images of the character being scanned by the oscillating reading mirror 11 are projected into the rotatable scanning disk 28, the prisms for redirecting the two image beams being arranged so that one image is the complete reverse of the other and is inverted relative to the other.

The scanning disk 28, may be of the type disclosed in U.S. Patent No. 2,978,590 granted to David H. Shepard on April 4, 1961, and in one practical embodiment may be a 7.5 inch diameter aluminum disk containing twenty-four radial slits 28' spaced at equal intervals, the slits being 0.010 inch by ⅝ inch long located on a 3 inch radius. The scanning disk 28 in this preferred embodiment is rotated at a rate of 7200 revolutions per minute, thereby providing 2400 scans per second as a scan repetition rate. The image beams emerging from the prisms 27 and 30, which are indicated by the reference characters 31 and 32, are spaced laterally from each other in relation to the diameter of the scanning disk 28 so that the images of the character are focused on diametrically opposite zones of the scanning disk 28 scanned by the radial slits 28' during rotation of the disk. The portions of the character images which pass through the radial slits 28' in the scanning disk 28 fall upon fixed slit plates 33 and 34 each having a pair of horizontal slots 33*a*, 33*b* and 34*a*, 34*b* respectively therein, which may be slightly shorter in length than the spacing betwen successive radial slits 28' of the scanning disk 28. In a practical embodiment, the fixed slit plates may be of the character illustrated in FIGURE 2 wherein the slits are each 0.010 inch wide, the slits on each disk are spaced approximately .145 inch apart measured from their center lines, the slits 33*a* and 33*b* having lengths of .735 and .701 inch respectively, and the slits 34*a* and 34*b* having lengths of .738 and .774 inch respectively.

FIGURE 2 illustrates in broken lines the two images of a character being scanned as they are projected onto the scanning disk 28, showing that one of the images is the reverse of the other and is inverted with respect thereto and that the two optical channels project the images onto opposite sides of the scanning disk. It will be apparent that the character images must be the reverse and inverse of each other so that scanning occurs in the same direction for both images.

FIGURE 3 illustrates the manner in which the detector phototubes are arranged in relation to the stationary slits and scanning disk to respond to the light transmitted through the intersecting portions of the radial and fixed slits. The image directed through the lens 23 and along the optical channel provided by the prisms 29 and 30, shown in FIGURE 2, is projected through a window 35 in the scanner housing 36 and through the fixed slit 34*b* in the slit plate 34 as a radial slit 28' of the disk 28 passes thereover, and is then redirected by mirrors 37 and 38 and focused by lens 39 to fall on the cathode of photomultiplier tube 40. Similarly, the image directed through the lens 23 and along the optical channel provided by the prisms 24, 25, 26 and 27 is projected through the window 35' of the scanner housing 36 and the slit 33*b* of the fixed slit plate 33 and thence through the lens 41 to the cathode of a photomultiplier tube 42. The photomultiplier tubes 40 and 42 respond to the portions of the image beams 31 and 32 passing through the fixed slits 34*b* and 33*b* as the radial slits 28' of the disk 28 pass along the fixed slits to provide information leading to the definition of the character by the automatic character sensing aparatus. A projection of each fixed slit 33*a* and 33*b* and 34*a*, 34*b* through the optical system onto the document defines the scanning line stations of the apparatus. By adjustment of the prisms in the optical paths, the two scanning line stations defined by the fixed slits 34*b* and 33*b* can be located at the same portion of the character or at contiguous or adjacent portions of the character thus providing a wide choice of character detection information which can be produced to fit many different recognition programs. Also, by reason of the fact that two images of the character are created which are scanned in the manner described above, it becomes feasible to detect character stroke slope and the direction of slope therby enhancing the interpretation of the character.

Additionally, a further scanning line station is provided by the fixed slit 33*a* of the fixed slit 33, which receives light from the lens 23 directed along the channel provided by the prisms 24, 25, 26 and 27, which light is redirected by mirrors 43 and 44 and focused by lens 45 to fall on the cathode of another photomultiplier tube 46. Appropriate circuitry may be intercoupled with the photomultiplier tube 46 to, in effect, examine the character and its location in the scanning field of the reading mirror 14 prior to recognition of the character to effect various adjustments in registration of the character-bearing document relative to the scanning field. For example, through this means, circuitry can be adjusted to variations in character registration to effect fine adjustment of the document position within the scanning field responsive to signals produced by the photomultiplier tube 46 in the manner disclosed in the said patent application of Howard W. Silsby III and James W. Taylor Serial No. 208,432 entitled Document Feeding Apparatus referred to hereinabove, which fine adjustment of character position can be accomplished prior to recognition of the characters responsive to signals produced by the photomultiplier tubes 40 and 42.

A fourth photomultiplier tube 47 is provided which receives light through the fixed slit 34*a* of the slit plate 34 through a lens 48. In an exemplary system, the phototube 47 may be used to provide signals indicating merely the presence or absence of a document in the reading field. In this case, the light received by the fixed slit 34*a* arrives along an optical path which is independent of the optical paths provided by the lens 23 and the prisms associated therewith and is not focused to produced an image of the document surface. Rather, the unfocused light from the document reading station, which may or may not be reflected by the oscillating reading mirror 11 if desired, it directed through the window 35 onto the fixed slit 34*a* where it is sensed by the photomultiplier tube 47 as merely "light" or "dark," depending on whether a document is in the reading field. Thus, sharp focusing of an image of any character or design on the document surface is not required with respect to the slit 34*a* and photomultiplier tube 47, this scanning station being used merely as a locator to indicate the edge of the document as it is being fed into the reading station. Appropriate circuitry responds to signals produced by the photomultiplier tube 47 to establish the presence of information to be scanned.

It will be apparent that by the above-described arrangement a marked increase in flexiblity of programs which might be employed to effect character recognition is provided. By creating two images from one sweep of the character, two different recognition programs may be employed for testing of the character, the results of which can either be compared for checking purposes or one result can be used to augment the other. The creation of the two character images can also be used to detect character stroke slope and the direction of slope by appropriate circuitry responding to the photomultiplier tubes detecting the flying spot scan over the character images, which would further enhance the interpretation of characters. The creation of two character images can further be used to detect the progressive branchings and joinings of strokes as the scanning progresses across the character in that a single pulse indicating a single stroke may be detected by the circuitry responding to one of the photomultiplier tubes while in approximately identical time synchronism two pulses corresponding to the branching of the single stroke will be detected by the circuitry responding to the photomultiplier tube associated with the contiguous or closely adjacent scanning slit. If the above conditions be detected in opposite relationship a joined pair of strokes may be detected. The sequences of branchings and joinings as invariant properties of certain characters independent of character style are such as to greatly facilitate the automatic recognition of characters. Further, by reason of the fact that simple adjustment of the prisms in the optical paths permits scanning of the same portion of the character or contiguous portions of the character or adjacent portions of the character as desired, the character portions examined at the scanning line stations can be spaced closer together than would be possible with separate spaced slits intercepting a single image of a character and the spacing between the scanning line stations can be readily varied at will over a wide range of spacings.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Scanning apparatus for use with an automatic character sensing device and the like for scanning an elongated scanning zone spanning a line of characters on a character-bearing document passing through a reading station comprising character reading scan means including optical means for directing an image of a small object zone on the document within the scanning zone along a selected optical path, and a sweep member for scanning the length of said scanning zone to shift the small object zone imaged along said optical path progressively between opposite ends of the scanning zone, and means for illuminating the small object zones being imaged along said optical path in synchronism with scanning of said sweep member comprising a projection light source for producing a high intensity light beam of small cross-section corresponding substantially to the size of said small object zone, a sweep mirror supported for rotation about a stationary pivot axis, and means connecting said sweep mirror to said sweep member for oscillating said sweep mirror in angular coordination with scanning of said sweep member over said scanning zone to continuously direct the beam of light from said projection light source onto the small object zone of the document within the scanning zone being imaged by said optical means along said optical path.

2. Scanning apparatus for use with an automatic character sensing device and the like for scanning an elongated scanning zone spanning a line of characters on a character-bearing document passing through an reading station comprising character reading scan means including optical means for directing an image of a small object zone on the document within the scanning zone along a selected optical path, and a first oscillatory sweep mirror supported for rotation on a driven shaft for scanning the length of said scanning zone to shift the small object zone imaged along said optical path progressively between opposite ends of the scanning zone, and means for illuminating the small object zones being imaged along said optical path in synchronism with scanning of said sweep mirror comprising a projection light source for producing a high intensity light beam of small cross-section corresponding substantially to the size of said small object zone, a second sweep mirror supported for rotation on said driven shaft in selected angular relation to said first mirror, and means for oscillating said sweep mirrors in synchronism for scanning of said second sweep member over said scanning zone in coordinated angular relation to said first mirror to continuously direct the beam of light from said projection light source onto the small object zone of the document within the scanning zone being imaged by said optical means along said optical path.

3. Scanning apparatus for use with an automatic character sensing device and the like for scanning an elongated scanning zone spanning a line of characters on a character-bearing document passing through a reading station comprising character reading scan means including detector means for producing output voltage signals bearing a selected relation to the light intensity to which the detector means is exposed, optical means for directing an image of a small object zone on the document within the scanning zone to a selected image position to expose said detector means thereto, and a reading mirror supported for rotation about a pivot axis for sweeping in an oscillatory manner along the length of said scanning zone to shift the small object zone imaged at said image position progressively along the scanning zone, and means for illuminating the small object zones being imaged by said reading mirror and optical means at said image position in synchronism with sweeping of said reading mirror comprising a light source for producing a high intensity light beam of small diameter corresponding substantially to the size of said small object zone, an oscillatory illuminating mirror supported for rotation about said pivot axis, and means for oscillating said illuminating mirror in synchronism with sweeping of said reading mirror over said scanning zone including means coordinating the angular position of said illuminating mirror with sweeping of said reading mirror to continuously direct the beam of light from said light source onto the small object zone of the document within the scanning zone being imaged by said optical means at said image position.

4. Scanning apparatus for use with an automatic character sensing device and the like for scanning an elongated scanning zone spanning a line of characters on a character-bearing document passing through a reading station comprising character reading scan means including detector means for producing output voltage signals bearing a selected relation to the light intensity to which the detector means is exposed, optical means for directing an image of a small object zone on the document within the scanning zone to a selected image position to expose said detector means thereto, and a reading mirror supported for rotation on a driven shaft rotatable about a selected axis for sweeping in an oscillatory manner along the length of said scanning zone to shift the small object zone image at said image position progressively along the scanning zone, and means for illuminating the small object zones being imaged by said reading mirror and optical means at said image position in synchronism with sweeping of said reading mirror comprising a light source for producing a high intensity light beam of small diameter corresponding substantially to the size of said small object zone, an oscillatory illuminating mirror supported for rotation on said driven shaft in selected angular relation to said reading mirror to be oscillated by said shaft in synchronism with said reading mirror including means coordinating the angular position of said illuminating mirror with sweeping of said reading mirror to continuously direct the beam of light from said light source onto the small object zone of the document within the scanning zone being imaged by said optical means at said image position.

5. In optical scanning apparatus for use with an automatic character sensing device and the like to scan images of selected areas of a character-bearing document passing through a reading station, comprising image scanning means for scanning images of selected document areas at a pair of image scanning stations spaced from each other and from the reading station including optical stop means providing flying spot scanning of the images at said image scanning stations along selected scan lines spanning the images, optical means including a sweep member scanning a scanning zone at said reading station for directing an image of the selected document areas in the scanning zone from the reading station along a first optical path section, dual optical channel means for separating said image from said first optical path section into a pair of images of the same selected document area and directing the same along a pair of separate optical path sections to said pair of image scanning stations, and means for adjusting said dual optical channel means for changing the relative positions of the images at said scanning stations to vary the relative positions of the image portions intercepted by the scan lines at one of said scanning stations toward or away from the image portions intercepted by corresponding scan lines at the other of said scanning stations.

6. In optical scanning apparatus for use with an automatic character sensing device and the like to scan images of selected areas of a character-bearing document passing through a reading station, comprising image scanning means for scanning images of selected document areas at a pair of image scanning stations spaced from each other in a common image plane and from the reading station including optical stop means providing flying spot scanning of the images at said image scanning stations along selected scan lines spanning the images, optical means including a sweep member scanning a scanning zone at said reading station for directing an image of the selected document areas in the scanning zone from the reading station along a first optical path section, dual optical channel means for separating said image from said first optical path section into a pair of images of the same selected document area and directing the same along a pair of separate optical path sections to said pair of image scanning stations, said optical channel means including means for causing the image directed to one of said scanning stations to be the reverse and the inverse of the other, and means for adjusting said dual optical channel means for changing the relative positions of the images at said scanning stations to vary the relative positions of the image portions intercepted by the scan lines at one of said scanning stations toward or away from the image portions intercepted by corresponding scan lines at the other of said scanning stations.

7. In optical scanning apparatus for use with an automatic character sensing device and the like to scan images of selected areas of a character-bearing document passing through a reading station, comprising image scanning means for scanning images of selected document areas at a pair of image scanning stations spaced from each other in a common image plane and from the reading station including optical stop means providing flying spot scanning of the images at said image scanning stations having stationary slits at said scanning stations defining selected scan lines spanning the images and rotary mask means rotatable about an axis located between said scanning stations having moving slits arranged in a path to traverse said stationary slits and form scanning apertures at the intercepts thereof, optical means including a sweep member scanning a scanning zone at said reading station for directing an image of the selected document areas in the scanning zone from the reading station along a first optical path section, dual optical channel means for separating the image from said first optical path section into a pair of images of the same selected document area and directing the same along a pair of separate optical path sections to said pair of image scanning stations, and said optical channel means including means for causing the image directed to one of said scanning stations to be the reverse and inverse of the other.

8. In optical scanning apparatus for use with an automatic character sensing device and the like to scan images of selected areas of a character-bearing document passing through a reading station, comprising image scanning means for scanning images of selected document areas at a pair of image scanning stations spaced from each other in a common image plane and from the reading station including optical stop means providing flying spot scanning of the images at said image scanning stations having stationary slits at said scanning stations defining selected scan lines spanning the images and rotary mask means rotatable about an axis located between said scanning stations having moving slits arranged in a path to traverse said stationary slits and form scanning apertures at the intercepts thereof, optical means including a sweep member scanning a scanning zone at said reading station for directing an image of the selected document areas in the scanning zone from the reading station along a first optical path section, dual optical channel means for separating the image from said first optical path section into a pair of images of the same selected document area and directing the same along a pair of separate optical path sections to said pair of image scanning stations, said optical channel means including means for causing the image directed to one of said scanning stations to be the reverse and inverse of the other, and means for adjusting said dual optical channel means to change the angular relationship of one of said separate optical sections with respect to the other to vary the image portion intercepting a stationary slit at one of said scanning stations relative to the image portion intercepting a corresponding stationary slit at said other scanning station.

9. In optical scanning apparatus for use with an automatic character sensing device and the like to scan images of areas of a character-bearing document passing through a reading station, a cyclically driven rotatable scanning disk having a plurality of radial slits therein spaced uniformly along a circular path concentric with the axis of the disk, optical means including a sweep member scanning a scanning zone at said reading station for directing an image of the document areas in the scanning zone from said reading station along a selected optical path section toward said disk to image characters in said scanned areas on said scanning disk, plural optical channel means including beam splitting means intercepting said selected optical path section for providing two emergent images of the same character image received by said beam splitting means and directing the same along separate optical path sections to said scanning disk at a pair of scanning stations spaced on opposite sides of the axis of the scanning disk in the path of said radial slits, stationary slit members disposed immediately adjacent said scanning disk at each of said scanning stations to receive light passing through said radial slits each having a pair of spaced parallel slits extending transversely of the optical axis of the image and parallel to a tangent of the scanning disk whereby portions of the images at said scanning stations are transmitted through registering portions of said parallel slits at one of said scanning stations and said radial slits and through registering portions of at least one of said parallel slits at the other of said scanning stations and said radial slits as the radial slits are swept substantially along the length of the parallel slits, and photocell means positioned adjacent said stationary slit members and associated with each of said parallel slits to be activated in response to the light intensity of the portions of said images transmitted through the registering portions of radial slits and said parallel slits, said means for directing said emergent images from said beam splitting means to said scanning stations including means disposing one of said emergent images in reverse and inverse relation to the other of said emergent images at said scanning stations to arrange the emergent images at the scanning stations in the same orientation relative to the direction of movement of the adjacent scanning disk portions.

10. In optical scanning apparatus for use with an automatic character sensing device and the like to scan images of areas of a character-bearing document passing through a reading station, a cyclically driven rotatable scanning disk having a plurality of radial slits therein spaced uniformly along a circular path concentric with the axis of the disk, optical means including a sweep member scanning a scanning zone at said reading station for directing an image of the document areas in the scanning zone from said reading station along a selected optical path section toward said disk to image characters in said scanned areas on said scanning disk, plural optical channel means including beam splitting means intercepting said selected optical path section for providing two emergent images of the same character image received by said beam splitting means and directing the same along separate optical path section to said scanning disk at a pair of scanning stations spaced substantially diametrically oppositely of the scanning disk in the path of said radial slits, stationary slit members disposed immediately adjacent said scanning disk at each of said scanning stations to receive light passing through said radial slits each having a pair of spaced parallel slits extending transversely of the optical axis of the image and parallel to a tangent of the scanning disk whereby portions of the images at said scanning stations are transmitted through registering portions of said parallel slits at one of said scanning stations and said radial slits and through registering portions of at least one of said parallel slits at the other of said scanning stations and said radial slits as the radial slits are swept substantially along the length of the parallel slits, and photocell means positioned adjacent said stationary slit members and associated with each of said parallel slits to be activated in response to the light intensity of the portions of said images transmitted through the registering portions of radial slits and said parallel slits, said means for directing said emergent images from said beam splitting means to said scanning stations including means disposing one of said emergent images in reverse and inverse relation to the other of said emergent images at said scanning stations, and means for adjusting said plural optical channel means for changing the relative positions of the character images at said scanning stations to vary the relative positions of the image portions intercepted by said parallel slits at one of said scanning stations toward or away from the image portions intercepted by at least one corresponding parallel slit at the other of said scanning stations.

References Cited by the Examiner

UNITED STATES PATENTS

| | | | |
|---|---|---|---|
| 2,600,168 | 6/52 | Klyce | 250—219 |
| 2,927,216 | 3/60 | Lohninger | 250—219 |
| 2,933,246 | 4/60 | Rabinow | 250—219 |
| 3,056,033 | 9/62 | Shepard | 250—219 |

RALPH G. NILSON, *Primary Examiner.*

WALTER STOLWEIN, *Examiner.*